July 28, 1959     O. B. SHERMAN     2,896,251
MACHINE FOR MOLDING PLASTIC MATERIALS
Filed April 1, 1958
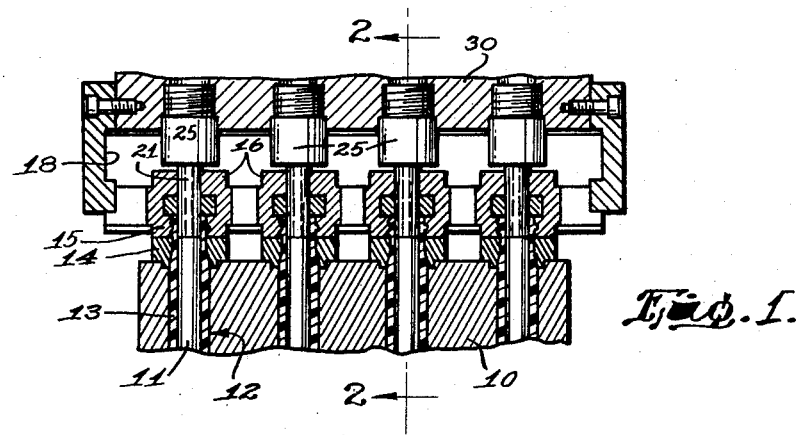
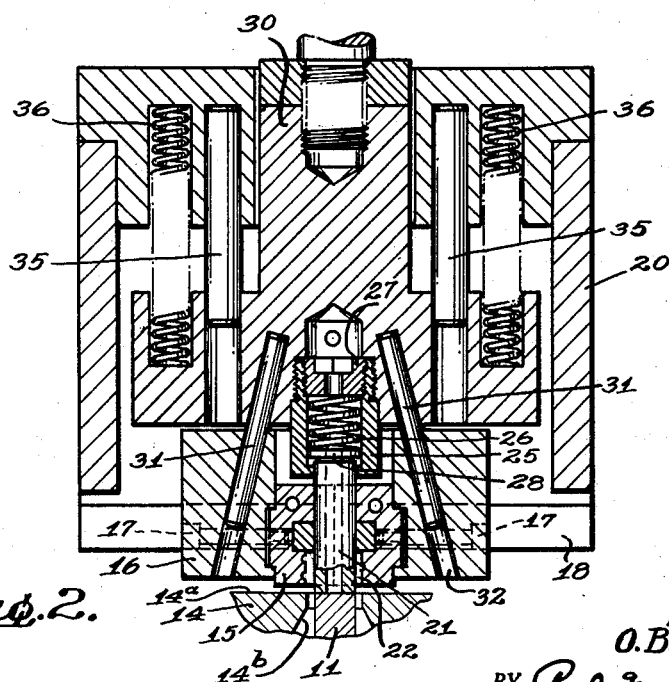
INVENTOR.
O. B. SHERMAN
BY *Rule and Hoge*,
ATTORNEYS 2,896,251

MACHINE FOR MOLDING PLASTIC MATERIALS

Orville B. Sherman, Toledo, Ohio, assignor to Owens-Illinois Glass Company, a corporation of Ohio Application April 1, 1958, Serial No. 725,755

4 Claims. (Cl. 18—5)

My invention relates to molding machines and apparatus for molding materials in a soft plastic condition and forming various articles. In the preferred form herein illustrated and described the invention is particularly adapted for use in the manufacture of containers consisting of plastic materials formed by combined injection molding and extrusion methods.

This application is a continuation-in-part of my pending application Serial No. 533,856, filed September 12, 1955, now abandoned.

Various methods and apparatus heretofore have been devised wherein tubular parisons having completely formed neck portions or finishes are made by a combined injection molding and extrusion process. Such a process is defined in my Patent 2,710,987. In such methods the inside surface of a hollow neck is formed in part against the surface of a core forming the inner part of a neck mold or neck ring assembly, and in part against the surface of a mandrel or extrusion orifice core which forms an inner member of an extrusion die through which the molding material is extruded.

During the initial stage of forming this neck portion or finish it is essential that a tight fit be maintained between the end of the neck mold core and the abutting end of the mandrel. If there is any space between the core and the mandrel at the time the plastic is being forced into the neck mold to fill the mold cavity, a part of the plastic will enter between the core and mandrel, forming a ring of flash within the neck opening of the container. Further, in order to prevent flash on the outside surface of the molded neck at the parting line between the neck mold and the surface of the extruder against which it abuts, it is also essential at this stage of the operation to maintain a tight fit between these parts.

Finally, and most importantly, it has been found necessary to maintain contact between the mandrel and the neck mold core for a brief time following separation of the neck mold and the abutting surface of the extruder, so as to prevent the creation of an internal fin.

The primary object of the present invention is to provide novel and practical means for overcoming the above recited difficulties. To this end the invention provides a construction in which the neck mold core is spring loaded in a manner to allow a limited lengthwise movement of the core relative to the neck mold when the neck mold is withdrawn from the extrusion orifice.

The extent of relative neck mold-neck mold core movement must be sufficient to allow the dissipation of the extremely high injection molding pressures prior to separation of the neck mold core from the extrusion orifice core. By maintaining contact between the neck mold core and the extrusion orifice core, it is possible to prevent the occurrence of any internal flash or fin which might otherwise be formed.

It is, therefore, an important object of this invention to provide an apparatus and method for the prevention of internal fins in plastic receptacles or the like formed by combined injection molding and extrusion techniques.

Another object is to provide a method wherein a neck mold core is biased into contact with an extrusion orifice core to prevent separation thereof and to prevent the injection of plastic therebetween during separation of a neck mold and an extrusion orifice.

A further important object is the provision of a combined injection molding and extrusion apparatus wherein a neck mold is contractable with an extrusion orifice for the injection of plastic into the mold and separable from the orifice to extrude a plastic tube, and a neck mold core is maintained in contact with an orifice core during initial mold-orifice separation.

Other objects of the invention and the precise nature thereof will appear more fully hereinafter.

Referring to the accompanying drawings which illustrate a portion of a machine embodying the present invention:

Fig. 1 is a sectional elevation of a battery of molding units each including extrusion means and a neck ring or mold; and Fig. 2 is a section at the line 2—2 on Fig. 1, on a larger scale.

The apparatus as shown is particularly adapted for forming bottles or other containers and as shown may constitute a portion of a machine of the type disclosed in the copending application of Mumford et al., Serial No. 403,594, filed January 12, 1954, Apparatus for Forming Hollow Plastic Articles.

As shown in Fig. 1 a plurality of molding units are associated with an extruder 10. Each unit comprises a mandrel 11 which forms a core extending vertically within a cylindrical opening 12 in the extruder and together with the wall surface of said opening defines a tubular channel or annular extrusion orifice through which plastic molding material 13 is forced. The several units may be of like construction. Each unit includes an extrusion nozzle 14 through which the plastic is forced into a neck ring or mold 15. The neck ring comprises partible sections connected by bolts 17 to neck ring holders 16. The holders 16 are mounted for horizontal reciprocating movement in guideways 18 for opening and closing the neck molds. The guideways or slides 18 are connected to a frame 20.

A neck pin or neck mold core 21 which is mounted within and extends vertically through the neck mold cavity 22, serves as a molding element for molding the inner neck surface of the molded article. The neck core 21 is carried by a neck core holder 25 which is of hollow cylindrical formation to receive a compression spring 26 by which the neck core is spring loaded. The spring 26 is held under compression by a plug 27 threaded into the upper end portion of the holder. The holder 25 is mounted in a head 30. The downward movement of the neck core 21 within the holder 25 is limited by an inner flange or shoulder formed on the holder and a head 28 formed on the upper end of the neck core.

The frame 20 and head 30 are mounted for relative movement up and down. The head 30 may be reciprocated by means of a piston rod 29 of a piston motor such as shown in the aforementioned application, Mumford et al.

Inclined rods 31 extend upwardly into bores in the head 30 and are fixed therein. The rods 31 extend downwardly into openings 32 in the neck mold holders 16, thereby providing a slidable connection between the holders 16 and the rods. When the head 30 is lowered relative to the holders 16 the latter are cammed or drawn inwardly by the rods 31 to close the neck ring as shown in Fig. 2.

The neck core 21 is of a length to protrude downwardly a short distance below the bottom face of the neck mold 15, in which position it is yieldingly held by the compression spring 26 while the head 30 is in its lifted position and during the downward movement of said head. When the head 30 is moved downward the neck mold holders 16 are moved inwardly by the rods 31 and close the mold. The mold sections reach their closed positions and the neck core 21 is brought into contact with the orifice core 11 a short time before the downward movement of the head 30 is completed. During the final downward movement the neck core 21, after seating on the orifice core 11, is lifted a short distance relative to neck mold against the expansive force of the spring 26. This relative upward movement of the neck core permits the neck mold to seat on the upper surface 14ª of the nozzle 14. With this construction the abutting ends of the orifice core 11 and the neck core 21 are held tightly together under the spring pressure while the opposite surfaces of the nozzle 14 and neck mold are brought together.

In this manner a close fit is provided between the extrusion nozzle and the mold and also between the orifice core and neck core while the plastic is being extruded and forced into the mold cavity, thus preventing any entrance of the plastic between such abutting surfaces. This avoids the formation of any flash either externally or internally of the molded neck during the filling operation. The spring 26 holds the cores 21 and 11 tightly together while permitting them to move up or down as a unit to any extent necessary to allow close contact between the neck mold and extruder surface 14ª.

The head 30 is guided during its vertical movement within the frame 20 by guide pins 35. Coil springs 36 under compression apply a yielding downward force to the head 30 tending to close the neck molds.

The nozzle 14 is formed with a molding surface 14ᵇ which forms a continuation of the outer wall surface of the neck mold cavity, the molding surfaces being of the same diameter at their line of juncture, thus providing a molding surface extending through the neck mold into the body molding portion of the extruder. The abutting ends of the two cores, namely the extrusion core 11 and the neck core 21, being of the same diameter and contour and being in vertical alignment, provide an inner molding surface extending uninterruptedly through the neck mold into the nozzle 14.

The function of the compression spring 26 is to hold the neck pin and mandrel together by a yieldable endwise pressure before, during and after injection molding or filling of the neck mold. Although the neck pin is the element which is yieldable under spring pressure, the mandrel 11 might in like manner be mounted for a limited vertical movement under spring pressure, either as a supplement to the spring 26 or a substitute therefor.

After the neck mold 15 has been filled with plastic material from the orifice or nozzle 14, the neck mold is elevated to extrude a tubular plastic sleeve integral with the material filling the neck mold, as described in my Patent 2,710,987. Since substantial plastic pressures are utilized during the injection or filling operation, e.g., on the order of 16,000 p.s.i., any separation of the cores 11 and 21 may well accommodate the flow of plastic therebetween and the consequent formation of an internal fin in the final container. Such internal fins are extremely difficult to remove.

However, the high pressures for injection are dissipated during the initial extrusion of the tubular sleeve and rapidly drop substantially to an extrusion pressure of much less magnitude, e.g., on the order of 3500 p.s.i., the spring 26 maintains contact between the cores 11 and 21 during the transition from injection pressure to extrusion pressure and prevents the formation of internal fins.

The formation of external fins has not been a problem because of the chilling effect of the relatively massive neck molds and extrusion bodies and their exposure to atmospheric temperatures, whereas the orifices are completely surrounded by the heated plastic.

Modifications may be resorted to within the spirit and scope of my invention as defined in the appended claims.

I claim:

1. A method of combined injection and extrusion molding of a container blank having an injection molded neck confined in a neck mold and a generally cylindrical extruded tube integral with said neck, comprising the steps of superimposing a neck mold over an extruder body having an annular orifice defined by an extrusion aperture and a central orifice core, lowering the neck mold into contact with said extruder body, contacting the orifice core with a neck mold core extending axially of said neck mold and defining the neck dispensing opening, biassing said neck mold core into engagement with said orifice core, injecting plastic material through said orifice into the space intermediate said neck mold and said neck mold core, moving the neck mold from contact with said extruder body to extrude a plastice tube integral with the plastic material in said neck mold, and maintaining the neck mold core in contact with said orifice core during initial extrusion of said tube to prevent flash of pressured plastic material between said cores and the formation of an internal fin at the juncture of the neck and the tube.

2. In a molding apparatus for the formation of a plastic container and including a neck mold having a cylindrical open-ended molding space, an extruder body having an aperture therein and a concentric body defining an annular extrusion orifice for communication with a body of plastic material, and means supporting said neck mold for reciprocal movement between a first position overlying and spaced from said orifice to a second position contacting said body and registering with said orifice to be filled with plastic material therefrom, movement of the neck mold to said first position from said second position accommodating the extrusion of a tubular plastic sleeve integral with plastic material filling said neck mold, the improvement of means to prevent internal flash rings in said sleeve comprising a neck mold core concentric with and extending axially through said neck mold for contact with the body core only of said annular orifice, lost-motion means accommodating movement of said neck mold core relative to said neck mold, and spring means biassing said neck mold core into contact with said body core, said lost-motion means accommodating limited initial movement of said neck mold toward its first position and initial tubular sleeve extrusion while maintaining neck mold core-to-body core contact.

3. In a molding apparatus for forming a plastic container and having a neck mold, an extruder body having an annular extrusion orifice and a body orifice core located centrally of said orifice and adapted to receive a flowable plastic material and means supporting said neck mold for movement in one direction into contact with said body and in registry with said orifice to receive plastic material from said orifice and for movement in an opposite direction from said body to accommodate extension of a tubular body integral with the plastic filling said neck mold, the improvements of a neck mold core carried by and movable relative to said neck mold, and spring means accommodating such relative movement, said neck mold core normally projecting beyond said mold to initially contact the body orifice core upon movement of the neck mold in said one direction, said neck mold core being flush with said neck mold and the body orifice core during contact of the neck mold and the body and filling of said neck mold, and said neck mold core remaining in contact with said body orifice core during initial movement of the neck mold in the opposite direction and initial extrusion of said tubular body.

4. In a molding apparatus for the formation of a plastic container and including a neck mold having a cylindrical open-ended molding space, an extruder body having an aperture therein and a concentric body core disposed in said aperture and defining an annular extrusion orifice, and means for reciprocating said neck mold between a first position spaced from said orifice to a second position registering with said orifice to be filled with plastic material therefrom, movement of the neck mold to said first position from said second position accommodating extrusion of a tubular plastic sleeve integral with plastic material filling said neck mold, a neck mold core extending axially through said neck mold for contact with the body core and movable axially relative thereto, and means biassing said neck mold core into contact with said body core, said means accommodating limited initial movement of said neck mold toward its first position and initial tubular sleeve extrusion while maintaining said neck mold core in contact with said body core.

References Cited in the file of this patent

UNITED STATES PATENTS

| | | |
|---|---|---|
| 1,649,532 | Lorenz | Nov. 1, 1927 |
| 2,619,774 | Rowe | Dec. 2, 1952 |
| 2,710,987 | Sherman | June 21, 1955 |